June 4, 1957   J. SCHMIDT   2,794,451
METHOD AND APPARATUS FOR FILLING CONTAINERS WITH A MEASURED CHARGE
Filed June 21, 1955   3 Sheets-Sheet 1

INVENTOR
JOHN SCHMIDT
ATTORNEY

INVENTOR
JOHN SCHMIDT

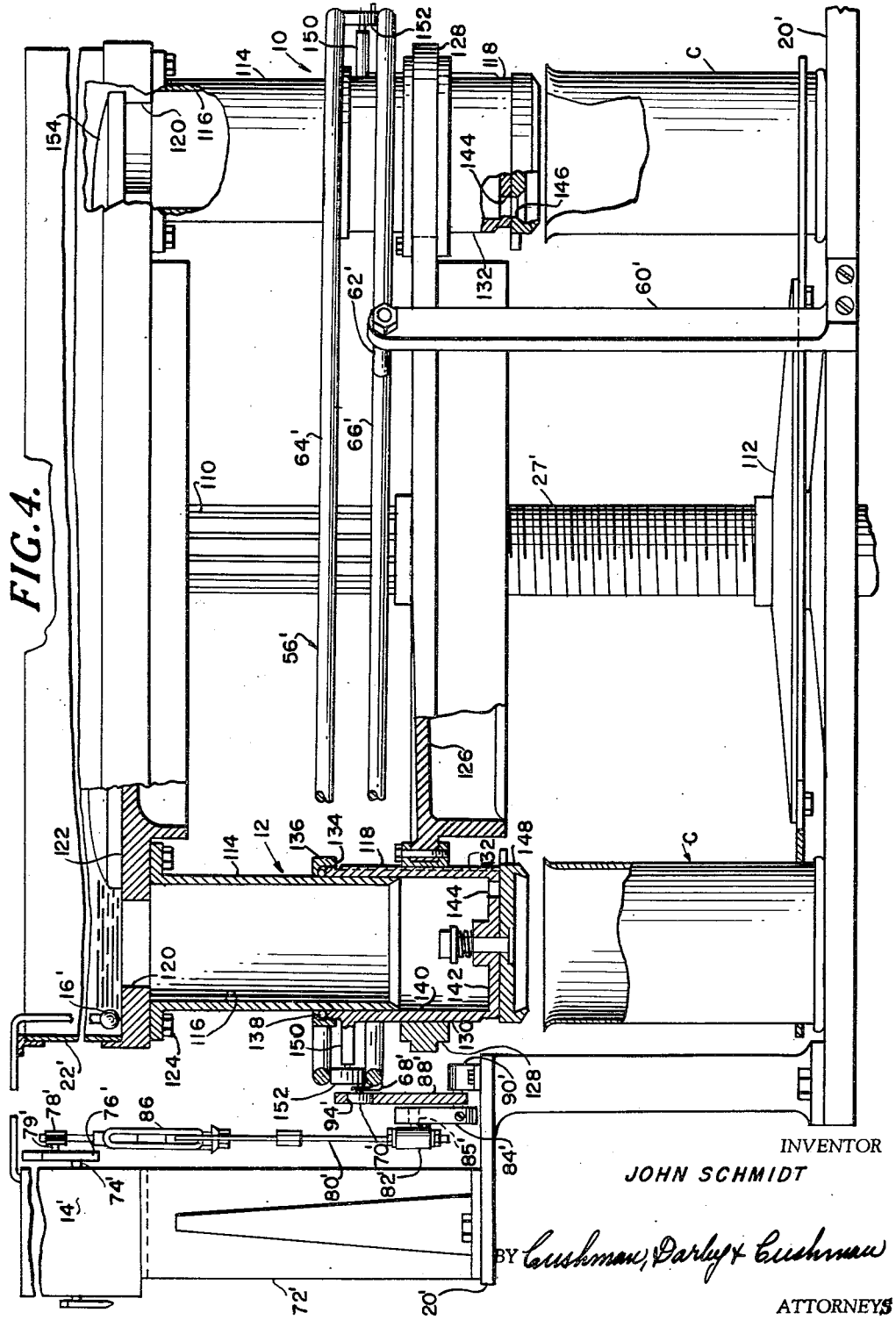

United States Patent Office 2,794,451
Patented June 4, 1957

2,794,451

METHOD AND APPARATUS FOR FILLING CONTAINERS WITH A MEASURED CHARGE

John Schmidt, Jenkintown, Pa., assignor to Crown Cork & Seal Company, Inc., Philadelphia, Pa., a corporation of New York Application June 21, 1955, Serial No. 516,986

29 Claims. (Cl. 141—1)

The present invention relates to a method and apparatus for filling containers with a measured charge of fluent material and, more particularly, to a method and apparatus capable of accurately controlling the volume of a charge of fluent material delivered to successive containers in accordance with certain specified standards.

In the operation of automatic filling machines for filling containers such as cans, bottles, jars or the like with a fluent material such as oil, syrup, fruit juices, mayonnaise, various paste products or the like, difficulties have been encountered in obtaining an accurate fill by volume. Many variables or factors must be taken into consideration in determining how accurate a filling operation can be. Such variables or factors as intermittent operation of the filler, maintenance and condition of the filler, container variation in size and weight, can be substantially obviated by quality control resulting in obtaining a high degree of accuracy in the filling operation. In other words, a more careful individual adjustment of the volume of each measuring pocket of the filler by the operator, a continuous operation of the filler at a constant speed, and the use of a more standard can will materially assist in the elimination of some of the difficulties in obtaining an accurate measured charge when filling containers.

One of the most important factors in causing inaccuracy in filling containers with a measured charge has been temperature variations of the product being flowed into the containers. For example, in the filling of containers with oil, "The United States Bureau of Weights and Measures" requires that one quart of oil must measure by volume 57.77 cubic inches at 60° F. However, oil, which is processed in batches, will vary in temperature within the batches while and after cooling and within the reservoir of the filling machine when containers are being filled. Climatic changes, as well as changes within a batch of oil caused by processing, affect the expansion and contraction of the oil being delivered to containers, thereby making accurate filling of containers extremely difficult.

Since the packer is paid only for a declared contents of a container and must deliver a minimum amount of oil in each container as required by standards, in the past, the packer must fill a little extra oil into each container to take care of any variations in temperature of the oil when filling. In other words, if the temperature of the oil being filled into containers is above 60° F., it will occupy a larger space in the container than a standard measured quantity and, conversely, if the temperature of the oil is below 60° F. it will occupy less space than a standard measured quantity. Therefore, in the past, the packer would set his filling machine to fill a little extra oil into each container to take care of any temperature fluctuations and to be sure of delivering at least a minimum of oil as required in a standard measure. Overfilling of containers in a period of a year would cause the packer to realize no return for a large amount of oil.

Although the above description of filling a measured charge, in accordance with a specified standard, relates to oil, it will be appreciated that the same problems occur when filling any fluent material which will expand or contract upon increases or decreases in temperature of the fluent material.

An object of the present invention is the provision of a method and apparatus for filling containers with an accurate amount of fluent material regardless of temperature variations and fluctuations within the material.

Another object of the present invention is the provision of a method and apparatus for eliminating the necessity of overfilling containers with a fluent material to assure no underfilling of containers when filling containers with a charge which must be equal to a standard measure of the fluent material.

Still another object of the present invention is to provide a method and apparatus which will automatically compensate for any temperature changes of the fluent material as it is being filled into containers, the method and apparatus accurately controlling the quantity of filling.

A still further object of the present invention is to provide a filling machine having measuring pockets thereon adjustable in volume, the volume of the measuring pockets being continuously and automatically adjusted in accordance with any temperature variations in the fluent material.

Still another object of the present invention is the provision of a temperature responsive volume control device adapted for use in controlling the volume of filling of a filling machine.

A still further object of the present invention is to provide a device for controlling the volume of fill in accordance with expansion and contraction of the product being filled into a container, the device having means to compensate for variation in flow characteristics of various fluent materials. Ancillary to the preceding object, the means to compensate for varying flow characteristics of different fluent materials is also a means to adjust the device for fluent materials having different specific gravities.

These and other objects of the invention will appear more fully in the following specification, claims and drawings wherein:

Figure 3 is a fragmentary plan view of the filling machine showing the volume control device;

Figure 4 is a vertical section partly in elevation of a modification of the filling machine and temperature responsive volume control device disclosed in Figure 1; and Figure 5 is a fragmentary view of the reservoir of a filling machine of the present invention disclosing the fluent material inlet pipe and the temperature sensing element positioned within the fluent material inlet pipe.

Figure 1:
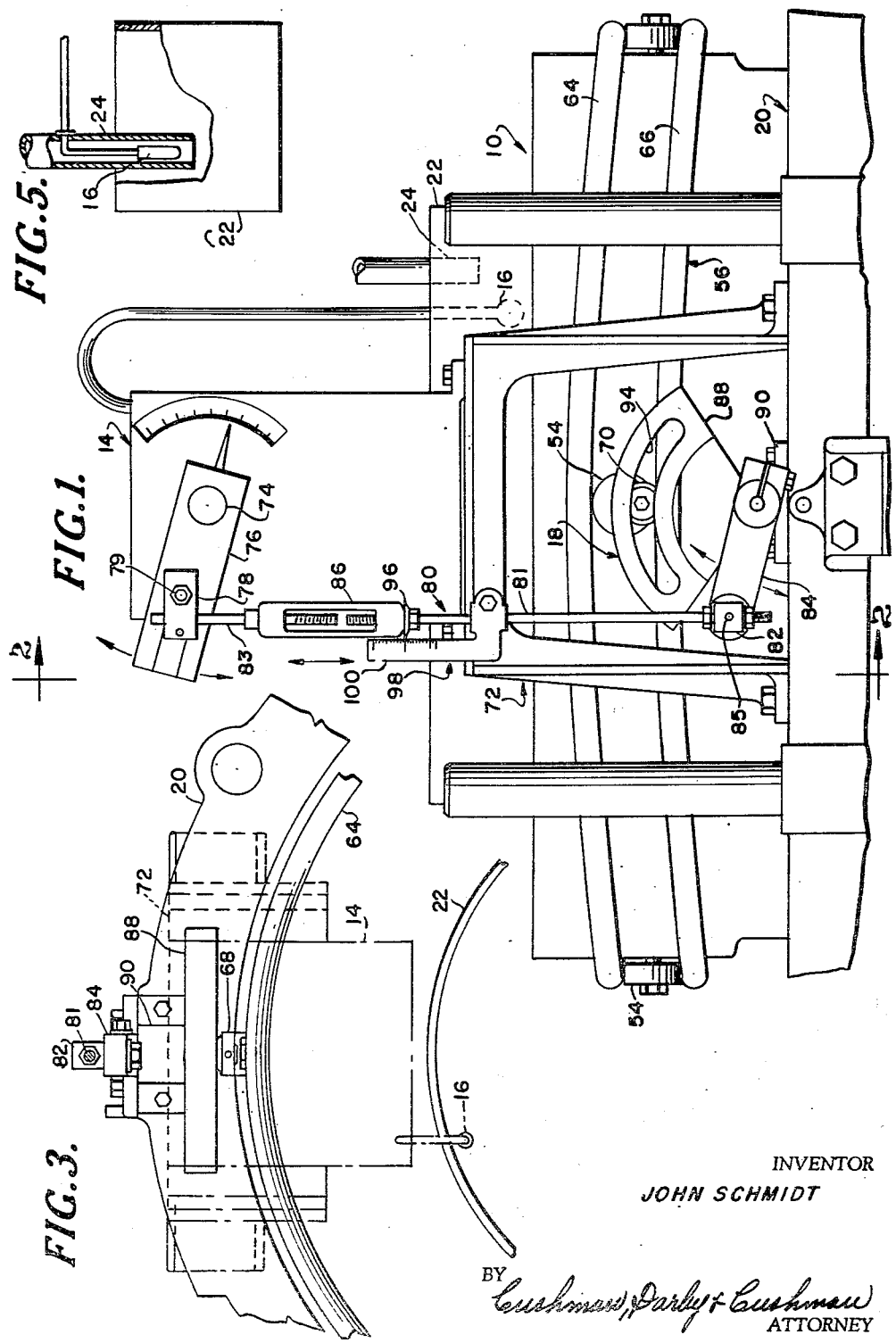
Figure 1 is a side elevational view of a filling machine of the present invention and disclosing in detail the device for controlling the volume of fill of containers in accordance with any temperature variations.
Figure 2:
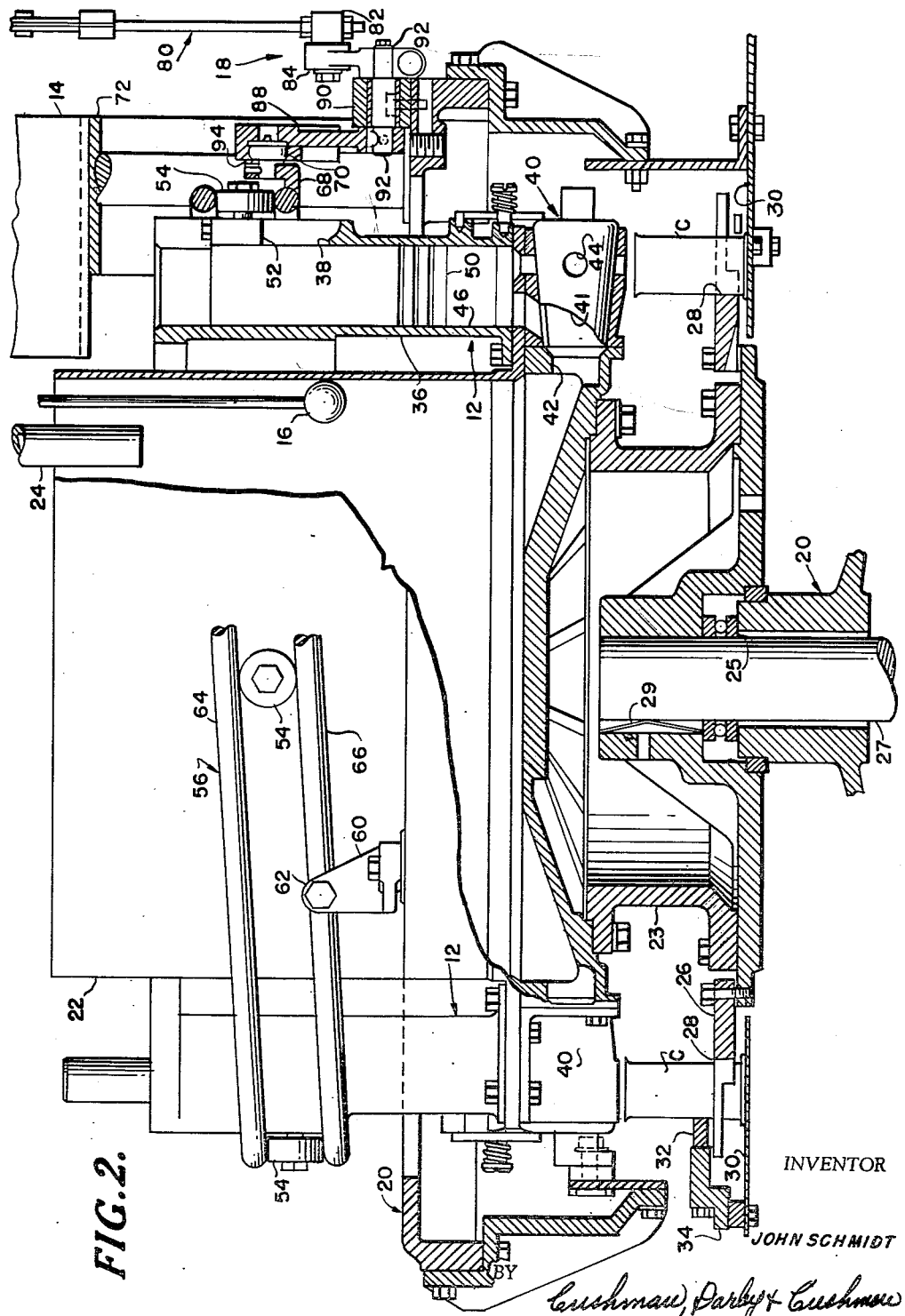
Figure 2 is a view of the filling machine of Figure 1 taken on the line 2—2 of Figure 1; parts of the filling machine are shown in elevation for the purpose of clarity.

Referring specifically to the drawings wherein like character or reference numerals represent like or similar parts, the filling machines generally indicated by the numeral 10 in Figures 1 and 4 are of the type having a plurality of measuring pockets generally indicated by the numeral 12 for measuring a charge of fluent material to be dispensed into a container C (Figures 2 and 4). The measuring pockets 12 have chambers therein which can be adjusted so as to vary the volume and take care of containers of different sizes. Further, an adjustment can be made to the chambers so as to make a fine adjustment to give a specific quantity for a specific size container. As heretofore pointed out, many fluent materials have a characteristic of expansion or contraction upon increase or decrease respectively in temperature and, consequently, if successive charges of fluent material equal to a standard measure are to be dispensed into successive containers, means must be provided to compensate for various temperature changes in the fluent material. In the past, it was the practice to set the volume of the measuring chamber in measuring pocket 12 to satisfy the most extreme temperature condition encountered. In other words, if the container C is a one quart container and must be filled with one quart of liquid measuring 57.77 cubic inches at 60° F., then to insure no underfilling of the containers, the volume of the charge measuring cylinder was increased to satisfy the highest temperature which would be encountered in the fluent material. If the temperature expected to be encounted was, for example, 80° F., the volume of measuring pocket 12 was set to fill the container C with a quantity of fluent material which was slightly more than a standard quart. Therefore, a container filled with fluent material at 80° F. would, when cooled to 60° F., have the volume of a standard quart.

However, this method of controlling the filling of containers with fluent materials has proved unsatisfactory because, as previously mentioned, temperature variations and fluctuations occur in the fluent material rapidly and many times during the course of a working day. Consequently, if under the above conditions of operation, the temperature of the fluent material being dispensed from the filling machine drops below 80° F., the charge measuring pocket of the filling machine would still be dispensing the same volume of fluent material as it did at 80° F. and the packer would be giving the consumer more fluent material than the consumer would actually be purchasing. Although the amount of overfill which may appear in one container appears small to the total contents of the container, it will be obvious that over a period of time a considerable amount of fluent material is given away by the packer in his efforts to give a minimum standard quantity.

The present invention provides for means to automatically change the volume of the chamber in the measuring pockets 12 to compensate for a fluctuation in temperature of the fluent material being dispensed. A temperature responsive device generally indicated by the numeral 14 and including a temperature sensing element or bulb 16 immersed in the fluent material is provided to control the volume of the chambers of measuring pocket 12. The temperature responsive device 14 is operatively coupled to the measuring pockets by a linkage mechanism 18 which will be described in more detail later in the specification.

A change in temperature of the fluent material as sensed by the temperature sensing element 16 is transmitted to the temperature responsive control device 14 where it is translated into mechanical movement to thereby move the linkage mechanism 18 in such a manner that the chambers of measuring pockets 12 are changed in volume. Assuming the measuring pockets have been set for a standard volume such as one quart measure at 60° F., an increase in temperature above 60° F., as sensed by sensing element 16, will cause the volume of the pockets to increase. Conversely, a decrease in temperature of the fluent material will be sensed by the sensing element 16 and mechanical movement will be translated to the pockets by linkage mechanism 18 to decrease the volume of the measuring pockets. In other words, an increase in temperature in the fluent material will necessitate a greater quantity of material by volume to be dispensed into containers C so that if the containers C cool to 60° F., the fluent material will shrink or contract to exactly the measured charge desired, such as one quart or 57.77 cubic inches of material. Where there is a decrease in temperature in the fluent material below the set standard of 60° F., it will only be necessary to fill the containers with a quantity of the fluent material which, when the fluent material in the container is heated up to 60° F., it will expand to exactly one quart.

Referring now in detail to Figures 1–3 inclusive, filling machine 10 is of the type having a stationary frame support 20, a portion only of which is shown in the drawings, and a reservoir 22 rotatable on the stationary frame support in any suitable manner. As best shown in Figure 2, reservoir 22 is fixedly connected to a cylindrical element 23 which is rotatably supported on the stationary frame support 20 by means of a suitable bearing 25. Cylindrical element 23 is keyed to a vertical drive shaft 27 as indicated at 29, the vertical drive shaft being driven by a suitable source of power (not shown).

Reservoir 22 may be supplied with a fluent material through the inlet pipe 24 from any suitable source of supply. Mounted on reservoir 22 for rotation therewith are a plurality of the measuring pockets 12. Also mounted for rotation with reservoir 22 and fixedly connected to the cylindrical element 23 is a sprocket assembly 26 having a plurality of pockets 28, one pocket being aligned with each of the measuring chambers 12. A suitable container table 30 is provided on the stationary support frame 20 for supporting containers C as they are carried beneath the measuring pockets 12 and are filled with the fluent material. A guide member 32 supported on table 30 by suitable brackets 34 is provided for retaining the containers C in the pockets 28 of the sprocket or starwheel 26 as it rotates. Although the means for conveying the containers beneath the measuring pockets as they are being filled is disclosed as a rotating starwheel and a stationary table on which the containers slide, it is, of course, within the scope of the invention to provide individual supporting platforms on a rotary table as well as suitable means for positioning containers on and removing filled containers from the filling machine.

Each measuring pocket 12 includes an elongated cylinder 36 opened at both ends and provided with a longitudinally extending slot 38. Slot 38 extends from the upper end and terminates short of the lower end of cylinder 36. Mounted on the lower end of each of the cylinders 36 is a valve mechanism generally indicated by the numeral 40. As shown in Figure 2, the valve mechanism may be of the plug type and is provided with an inlet port 41 communicating with the discharge port 42 in the bottom of reservoir 22, as well as with the chamber 46. The plug valve also has a discharge port 44 adapted to communicate with the chamber 46 and with the interior of container C positioned beneath the valve through a port in the valve casing. Suitable cam mechanism mounted on the stationary frame is used to rotate the plug type valve mechanism 40 to close the port 41 to measuring chamber 46 after the chamber has been filled and to open the port 44 to the measuring chamber 46 so that the container therebeneath can be filled. As shown in the righthand portion of Figure 2, valve mechanism 40 is in a position where the measuring chamber 46 is in communication with reservoir 22 and fluent material is being flowed into the chamber 46 to form a charge and fill the same. This condition is just prior to the chamber 46 being completely filled with fluent material as a piston 50 in chamber 46 is substantially at the top of its intake stroke.

Piston 50, which is reciprocally mounted in chamber 46, has a radially extending arm 52 carrying on its outer end a cam follower or roller 54. Arm 52 extends through the previously mentioned slot 38 in cylinder 36 and cam follower 54 is adapted to ride on a cam track 56 surrounding the reservoir 22. Cam track 56 is supported on the stationary frame 20 by a pair of oppositely disposed brackets 60. It will be noted that the brackets 60 permit the cam track 56 to be pivoted at 62 so that the stroke of the filling piston 50 can be varied at the point where the chamber 46 of measuring pocket 36 is being filled.

In more detail, cam track 56 is provided with upper and lower cam elements 64 and 66 respectively. The cam element 64 will cause the roller 54 to move downwardly thereby moving the piston 50 downwardly within cylinder 46 to discharge the fluent material therein through the port 44 in valve 40 and port in the valve casing into container C, whereas the lower cam element 66 moves the piston in its upward stroke to draw fluent material into the chamber 46 from reservoir 22. Cam element 64, which is supported above cam element 66 by suitable brackets mounted on cam element 66, need only encircle that portion of the reservoir where the downward stroke of piston 50 is required. On the other hand, it is desirable that cam element 66 completely encircle the reservoir since it is mounted for pivotal movement on the brackets 60.

At the high point of cam track 56, a lug element 68 is rigidly attached to the lower cam element 66 and extends radially outwardly therefrom. Lug 68 supports a cam follower 70, which is adapted to be moved vertically by linkage mechanism 18 as will be described in more detail later in the specification. Since cam track 56 is pivotally supported on the brackets 60 at 62, movement of the lug element 68 vertically by the cam follower 70 will cause the high point of the cam track to be varied and, consequently, the length of the stroke of piston 50 can be changed. If the lug element 68 is raised, the stroke of piston 50 will be increased and, consequently, on the upward stroke, the chamber 46 will be increased in volume and thus more fluent material will be drawn into the chamber from the reservoir 22. Conversely, a downward movement of the lug 68 will decrease the stroke of piston 50 and decrease the effective volume of the chamber 46 whereby the upward stroke of the piston 50 will draw into chamber 46 less fluent material.

Vertical movement of lug 68 and its cam follower 70 is caused by the linkage mechanism 18 and the temperature responsive device 14. Temperature responsive device 14 is mounted on the stationary frame 20 by any suitable means such as the platform stand 72. Temperature responsive device 14 includes the temperature sensing bulb 16 which may be a thermometer of the thermocouple type and a suitable drive motor (not shown) actuated by changes in temperature as sensed by temperature sensing bulb 16. A suitable Wheatstone bridge circuit or the like may be provided and connected to the temperature sensing bulb 16. Unbalancing of the Wheatstone bridge will be detected by an amplifier which is connected to the drive motor and will energize the same to balance the Wheatstone bridge. The drive motor is also connected to the linkage mechanism 18 and at the same time that the drive motor is energized, it will translate temperature changes into mechanical movement through the linkage mechanism 18 to move the lug member 68 in a vertical direction.

More specifically, the drive motor is provided with a drive shaft 74 which is adapted to be rotated in either a clockwise or counterclockwise direction depending upon the unbalancing of the Wheatstone bridge of the temperature responsive device 14 by a temperature change. Attached to the drive shaft 74 for movement therewith is a crank arm 76 to which a bar or element 78 is pivotally attached as shown at 79. Element 78 rigidly supports one end of a link member 80 while the other end of the link member is supported in a fitting 82 pivotally mounted on the end of a crank arm 84 as shown at 85. Link 80 is formed of two connected parts or rods 81 and 83. The ends of rods 81 and 83 are threaded and are held together by means of a turnbuckle 86, the purpose of which will be described in more detail later in the specification. Crank arm 84 is rigidly connected to a pivoted sector 88 which is mounted for pivotal movement on stationary frame 20 by means of the bearing bracket 90 as clearly shown in Figures 1 and 2. In more detail, bearing bracket 90 supports a pin 92 to which sector element 88 is keyed and crank arm 84 is fixedly connected.

Sector element 88 is provided with a trackway 94 eccentric with respect to pin 92 and in which cam follower 70 rides. Consequently, pivotal movement of sector element 88 about a horizontal axis will cause cam follower 70 to move vertically and thus move cam trackway 56 vertically through the lug 68. As previously mentioned, movement of the cam trackway at its high point will vary the stroke of the piston 50 to change the effective volume 46 of the measuring pocket 12 to a desired volume for a particular temperature of the fluent material.

As best shown in Figure 1, the linkage mechanism 18 is provided with means which may be adjusted to compensate for various specific gravities and flow characteristics of the fluent material. As previously mentioned, link member 80 is formed of the two rods 81 and 83, each having threaded ends, the threaded ends being connected together by means of the turnbuckle 86. Rotation of the turnbuckle 86 will increase or decrease the length of the link member 80 and, thus, change the effective movement of the sector 88 with respect to the movement of the drive shaft 74. In order that the operator of the filler may determine a suitable setting of the turnbuckle 86, a washer 96 is rigidly connected to the turnbuckle and an L-shaped scale member 98 is rigidly connected to the rod 81. The L-shaped scale member 98 is provided with one leg 100 which is parallel to the link 80 and on this leg suitable graduations are marked, the peripherial edge of washer 96 cooperating with the marking so that the operator may easily see and immediately adjust the linkage for a particular flow characteristic or specific gravity of the fluent material.

In Figure 1, the temperature sensing bulb 16 is shown positioned in the reservoir adjacent where the fluent material in the reservoir is supplied to the measuring pocket. By having the temperature sensing bulb 16 adjacent the position where the fluent material is discharged therefrom to the chamber 46, a very accurate charge can be dispensed. On the other hand, if temperature fluctuation in the reservoir is substantially small, it often times is desirable to sense the temperature of the fluent material as it enters the reservoir. Figure 5 discloses a modification wherein the temperature sensing bulb is positioned in the inlet tube 24 rather than in the reservoir 22.

Referring now specifically to Figure 4, a modified arrangement for controlling the quantity of a charge dispensed from a filling machine into a container is disclosed. In this arrangement, a gravity type of filler is utilized with temperature responsive volume control device similar to that disclosed in Figure 1. In more detail, the filling machine 10 includes a stationary frame support 20', a reservoir 22' rotatable with respect to the stationary frame support, and a plurality of charge measuring pockets 12 depending from the reservoir. The measuring pockets 12 are capable of receiving fluent material from the reservoir and dispensing the same into containers C successively positioned beneath each of the measuring pockets. Reservoir 22' is supported on a central column (not shown) and is splined to a drive shaft 27' as indicated at 110 for vertical movement with respect to stationary frame support 20'. Also fixedly connected to the drive shaft 27' for rotation thereby is a sprocket or starwheel assembly 112 having pockets therein, each pocket being in alignment with one of the measuring pockets 12 and adapted to receive and position a container under the discharge valve of the measuring pocket.

Each of the measuring pockets 12 includes an upper tubular section 114 which telescopes into a lower tubular section 118. The upper tubular section 114 has a bore 116 therethrough which is in axial alignment with a bore 120 in the bottom wall 122 of reservoir 22'. Upper tubular section 116 is attached to the bottom wall 122 of reservoir 22' by any suitable means such as bolts 124 or the like.

A turret 126 is fixedly supported on and rotates with the drive shaft 27' and is provided on its periphery with a circular flange 128 having a plurality of circumferentially spaced splined apertures 130. Lower telescoping tubular section 118 has its periphery splined as at 132 and is received in the splined apertures 130 of flange 128 for vertical movement with respect thereto. The upper end of lower section 118 is threaded at 134 and adapted to receive a threaded cap 136 which encompasses a ring gasket 138. Lower tubular section 118 is provided with a bore 140 having a diameter substantially equal to the outside diameter of the upper section 114, the bore 140 being closed at its lower end by a wall 142. Since tubular section 118 is adapted to telescope tubular section 114 and move vertically with respect thereto, gasket ring 138 provides a sliding seal between the sections preventing leakage of fluent material from the measuring chamber formed by the sections. The end wall 142 in lower section 118 is provided with an aperture or port 144 therethrough which is adapted to align with an aperture 146 of a rotatable valve disk 148. Valve disk 148 is rotated by suitable cam means mounted on the stationary frame support 20' to open and close the port 144 depending upon whether the fluent material is being discharged from or flowing into the measuring pocket 12. A radially extending lug 150 is provided on the upper end of the lower tubular section 118 and has a cam follower 152 on its outer end for cooperating with a cam track 56' as will be described in more detail later in the specification.

Positioned within and adjacent the bottom wall 122 of reservoir 22' is an arcuate valve plate member 154 which is adapted to cover and close the ports 120 as reservoir 22' rotates. More specifically, valve plate member 154 is suitably mounted on the stationary frame support 20' in order that it may remain stationary as reservoir 22' rotates. In other words, as reservoir 22' rotates, ports 120 during a portion of a revolution, pass beneath valve plate member 154 and are closed with respect to the charge chamber of the measuring pockets 12 and while during the remaining portion of the revolution, the ports will pass from beneath the valve plate and be opened to the chambers of the measuring pockets. Of course, when one of the ports 120 is opened to the interior of reservoir 22' and the charge chamber of the measuring pocket, fluent material will flow into the measuring pocket 12 and fill the same with a charge as the port 144 in the lower or valve end thereof will be closed. When one of the ports 120 is closed by valve plate 154, port 144 in the lower end of the measuring pocket will be in alignment with the port 146 in valve disk 148 and, thus, the charge of fluent material in the measuring chamber will flow therefrom into the container C. The charge of fluent material from the measuring chamber may flow by gravity into the container C or may be assisted by compressed air or the like depending on the viscosity of the fluent material.

Surrounding the measuring pockets 12 and adapted to cooperate with the cam followers 152 on each of the lower sections 118 of the measuring pockets is the previously mentioned cam track 56' which is substantially similar to the one disclosed in Figures 1 to 3 in that it has upper and lower cam elements 64' and 66' respectively. Cam track 56' is pivotally connected to the brackets 60' on a horizontal pivotal axis 62' whereby it can be pivoted to move the lower tubular section 118 vertically with respect to the upper tubular section 114. In other words, the pivots 62' are so positioned with respect to the valve plate 154 that the cam track 56' is raised or lowered to a desired position when the measuring pockets are being filled. By having the cam track 56' movable vertically at the position where the measuring pockets 12 are being filled with fluent material from reservoir 22', the lower section 118 of the measuring pockets is adjusted vertically with respect to the upper section 114 and, thus, the volume of the charge chamber of the measuring pocket is varied.

A platform stand 72' is positioned on stationary frame support 20' adjacent the position where cam track 56' is movable vertically. Mounted on the platform stand 72' is a temperature responsive device 14' which includes a temperature sensing bulb 16' extending into reservoir 22'. Temperature responsive device 14' is similar to the device as previously described with reference to Figures 1–3 and includes a drive motor operable in response to temperature changes in the fluent material as sensed by the temperature sensing bulb 16. Mounted on the drive shaft 74' for pivotal movement is a crank arm 76' having a rod or element 78' pivoted thereto at 79'. Rod 78' is rigidly connected to one end of a link member 80', the other end of the link member 80' being connected to a fitting 82'. A bracket 90', mounted on stationary frame support 20', pivotally supports a crank arm 84' which is pivotally connected to the fitting 82' at 85'. Mounted on bracket 90' for pivotal movement with crank arm 84' is a sector 88' having an eccentric trackway 94' similar to the trackway 94 of the sector 88 disclosed in Figure 1. A lug 68' fixedly connected to the lower cam element 66' of cam track 56' supports a cam follower 70' which rides in the trackway 94'.

A change of temperature in the fluent material in reservoir 22' as sensed by temperature sensing bulb 16' will be transmitted to the temperature responsive device 14' where it is translated into mechanical movement, thus, pivoting the crank arm 76' and moving the link member 80' to move the pivoted sector 88'. Movement of the pivoted sector 88' will cause the cam follower 70' riding in trackway 94' to move vertically either up or down and, thus, the cam track 56' is moved vertically up or down. Movement of the cam track 56' will cause the volume of measuring pocket 12' to be either increased or decreased depending upon the temperature change. In other words, an increase in temperature as sensed by the temperature sensing bulb 16' will cause the measuring pocket to increase in volume, whereas a decrease in temperature of the fluent material will cause the measuring pocket to decrease in volume.

Although the present invention has been disclosed in connection with a positive displacement piston type of filling machine and a gravity flow type of filling machine, it is, of course, within the scope of the invention that such a method and apparatus for controlling the volume of fill of containers in a specified relationshp with the temperature of the fluent material to obtain a standard measured charge could be used with any type of filling machine capable of filling to a variable volume.

The terminology used in the specification is for the purpose of description and not limitation, the scope of the invention being defined by the claims.

I claim:

1. In a filling machine for filling containers with fluent materials, a frame structure, a reservoir supported on said frame structure, means associated with said reservoir for filling containers with a measured charge of fluent material, said means comprising a measuring pocket capable of having its volume varied, means to fill said measuring pocket with fluent material and valve means for dispensing fluent material from said measuring pocket into a container, and means responsive to temperature changes of the fluent material, said last-mentioned means being operatively connected to said measuring pocket to vary the volume of said pocket upon a change of temperature of the fluent material.

2. In a filling machine for filling containers with fluent materials, a frame structure, a reservoir supported on said frame structure, means associated with said reservoir for filling containers with a measured charge of fluent material, said means including a measuring pocket having inner and outer telescoping sections shiftable relative to each other to vary its volume, means to fill said measuring pocket with a fluent material, valve means for dispensing fluent material from said measuring pocket into a container, and means responsive to temperature changes of the fluent material, said last-mentioned means being operatively connected to one of the telescoping sections of said measuring pocket to move the same with respect to the other of said sections thereby varying the volume of said pocket upon a change of temperature of fluent material.

3. In a filling machine for filling containers with fluent materials, a frame structure, a reservoir supported on said frame structure, means associated with said reservoir for filling containers with a measured charge of fluent material, said means comprising a measuring pocket capable of having its volume varied, valve means for dispensing fluent material from said measuring pocket into a container, a piston in said measuring pocket for filling said measuring pocket when said valve means is closed and for dispensing fluent material into a container from said measuring pocket through said valve means when the same is open, and means responsive to temperature changes of the fluent material, said last-mentioned means being operatively connected to the piston in said measuring pocket to vary the stroke of said piston upon a change of temperature of the fluent material and thereby varying the volume of said measuring pocket.

4. In a filling machine for filling containers with fluent materials, a frame structure, a reservoir supported on said frame structure, an inlet tube extending into said reservoir for supplying fluent material thereto, means associated with said reservoir for filling containers with a measured charge of fluent material, said means comprising a measuring pocket capable of having its volume varied, means to fill said measuring pocket with fluent material and valve means for dispensing fluent material from said measuring pocket into a container, temperature responsive means including a temperature sensing element in said fluent material, means operatively connecting said temperature responsive means with said measuring pocket to change the volume of said pocket upon a change of temperature of the fluent material as sensed by said temperature sensing element.

5. A container filling machine of the character described in claim 4 wherein said temperature sensing element is positioned in the fluent material in said reservoir.

6. A container filling machine of the character described in claim 4 wherein said temperature sensing element is positioned in the inlet tube for said reservoir.

7. A container filling machine of the character described in claim 4 wherein said means operatively connecting said temperature responsive means to said measuring pocket includes a movable element having an eccentric cam trackway and a cam follower cooperating with said cam trackway and operatively connected to said measuring pocket to vary the volume of the same.

8. A container filling machine of the character described in claim 7 wherein said measuring pocket includes inner and outer telescoping sections, and wherein said cam follower is connected to one of said sections to move the same with respect to the other of said sections.

9. A container filling machine of the character described in claim 7 wherein said measuring pocket includes a piston reciprocal therein, and wherein said cam follower is operatively connected to said piston to vary the stroke of the same thereby varying the volume of said measuring pocket.

10. In a container filling machine for filling containers with fluent materials, a frame structure, a reservoir supported on said frame structure, means associated with said reservoir for filling containers with a measured charge of fluent material, said means comprising a measuring pocket capable of having its volume varied, means to fill said measuring pocket with fluent material, valve means for dispensing fluent material from said measuring pocket into a container, a temperature responsive device including a temperature sensing element in said fluent material, means operatively connecting said temperature responsive device with said measuring pocket for changing the volume of said measuring pocket in response to changes in temperature of the fluent material as sensed by said temperature sensing element, said last-mentioned means including means to compensate for varying flow characteristics of the fluent materials.

11. A container filling machine of the character described in claim 10 wherein said means operatively connecting said temperature responsive device to said measuring pocket includes a link member connected to and for movement by said temperature responsive device, an element operatively connected to said link member and movable thereby, said element having an eccentric trackway, and a cam follower cooperating with and operatively connected to said measuring pocket for varying the volume of the same.

12. A filling machine of the character described in claim 11 wherein said means to compensate for varying flow characteristics of the fluent material includes means to adjust the length of said link member.

13. In a container filling machine for filling containers with fluent material, a frame structure, a reservoir supported on said frame structure, means associated with said reservoir for filling containers with a measured charge of fluent material, said means comprising a measuring pocket capable of having its volume varied, means to fill said measuring pocket with fluent material and valve means for dispensing fluent material from said measuring pocket into a container, and means responsive to the temperature of the fluent material, said last-mentioned means being operatively connected to said measuring pocket to increase the volume of said pocket upon an increase in temperature of said fluent material and to decrease the volume of said pocket upon a decrease in temperature of the fluent material.

14. The method of filling containers with a standard amount of liquid comprising the steps of: flowing the liquid into a reservoir, utilizing adjustable volume measuring chambers, successively filling the measuring chambers with liquid from the reservoir, flowing the liquid from successive measuring chambers into successive containers, continuously sensing the temperature of the liquid while filling successive containers, automatically increasing the volume of the measuring chambers when an increase in temperature is sensed and automatically decreasing the volume of the measuring chambers when a decrease in temperature in the liquid is sensed.

15. A method of the character described in claim 14 wherein the temperature of the liquid is sensed in the reservoir.

16. A method of the character described in claim 14 wherein the temperature of the liquid is sensed while the liquid is flowing into the reservoir.

17. A machine for filling containers with fluent material comprising a stationary frame structure, a reservoir supported on said frame structure and rotatable with respect thereto, a plurality of measuring pockets rotatable with said reservoir and each having a chamber therein adjustable in volume, means for supporting containers in vertical alignment with each of said measuring pockets, means for filling each of said measuring pockets with fluent material from said reservoir, valve means for dispensing the fluent material from filled measuring pockets into the containers, a temperature responsive means supported on said stationary frame and including a temperature sensing element in said fluent material, and means operatively connecting said temperature responsive means with said measuring pockets to vary the volume of the chamber in each of said measuring pockets upon a change of temperature of the fluent material as sensed by said temperature sensing element.

18. A machine of the character described in claim 17 wherein said last-mentioned means includes a link member connected to and movable by said temperature responsive means, a pivotally mounted sector element operatively connected to said link for pivotal movement thereby, said sector element including an eccentric trackway, a cam track associated with said measuring pockets and pivotally connected to said frame structure, a cam follower fixedly connected on said cam track and adapted to ride in the eccentric track of said pivoted sector element, said cam follower causing said cam track to move vertically when said sector is pivoted, and a plurality of cam followers cooperating with said cam track, one of said cam followers being operatively connected to each of said measuring pockets to vary the volume of the chambers therein.

19. A machine of the character described in claim 18 wherein each of said measuring pockets includes a piston reciprocal therein, said piston being connected to the cam follower cooperating with said cam track, the stroke of said piston being varied by movement of said cam track to vary the chamber in said measuring pocket.

20. A machine of the character described in claim 18 wherein each of said measuring pockets includes inner and outer telescoping sections shiftable relative to each other to vary the volume of its chamber, each of said cam followers cooperating with said cam track being connected to one of said telescoping sections to move it relative to the other of said telescoping sections of each of said measuring pockets.

21. A machine of the character described in claim 18 wherein means are provided to compensate for varying flow characteristics of fluent materials.

22. A machine of the character described in claim 21 wherein said compensating means includes providing said link member with threaded connected rods, said rods being connected to each by a turnbuckle whereby the length of said link member can be varied.

23. In a temperature responsive control device adapted for use with a filling machine of the type having a rotatable reservoir for fluent material and a plurality of measuring pockets associated therewith and capable of being adjusted to vary their volume, the combination of: a temperature responsive unit having a temperature sensing element for insertion into the fluent material, a link member operatively connected to said temperature responsive unit for movement thereby, a pivoted sector element having an eccentric trackway, said pivoted sector element being connected to said link member for movement thereby, a cam follower adapted to ride in the eccentric trackway of said pivoted sector and to move vertically when said sector element is pivoted, said cam follower adapted to be operatively connected to the measuring pockets to thereby vary the volume of the same upon a differential in temperature sensed by said temperature sensing element.

24. A temperature responsive control device of the character described in claim 23 wherein means are provided to compensate for various flow characteristics of the fluent material.

25. A temperature responsive control device of the character described in claim 24 wherein said compensating means includes providing said link member with threaded connected rods, said rods being connected to each other by a turnbuckle whereby the length of said link can be varied.

26. A temperature responsive device of the character described in claim 25 wherein one of the rods of said link member is provided with a scale element rigidly attached thereto, said scale element having graduations thereon extending parallel to said rods, and wherein an indicator element is provided on a portion of said link member movable with respect to the scale element.

27. In a filling machine for filling containers with a fluent material, a stationary frame structure, a reservoir supported on said frame structure and rotatable with respect thereto, a plurality of measuring pockets associated and rotatable with said reservoir, each of said measuring pockets having a chamber therein adjustable in volume, means for supporting containers in vertical alignment with each of said measuring pockets, a cam track encircling said measuring pockets, said cam track being supported on said frame structure and having at least a portion thereof movable vertically, a cam follower operatively connected to each of said measuring pockets and adapted to ride on said cam track, means to cause said cam track to move vertically in response to a temperature change of the fluent material and thereby vary the volume of said measuring pockets, said last-mentioned means comprising a temperature responsive unit having a temperature sensing element immersed in the fluent material, a crank arm connected to and pivoted by said temperature responsive unit upon a change in temperature of the fluent material, a rod pivotally connected to said first crank arm, a link member connected at one end thereof rigidly to said rod, a pivotally mounted sector element having an eccentric trackway, a crank arm connected at one end thereof to said sector element for pivoting the same and having the other end thereof pivotally connected to the other end of said link member, a cam follower fixedly connected to said cam track and adapted to cooperate with the eccentric trackway of said sector element, said last-mentioned cam follower adapted to be moved vertically when said sector element is caused to pivot by a temperature change in the fluent material and thereby move said cam track vertically.

28. A filling machine of the character described in claim 27 wherein said means to move said cam track vertically includes means to compensate for various flow characteristics of fluent materials, said last-mentioned means includes providing said link member with threaded rods connected together by a turnbuckle whereby the length of said link member can be varied.

29. In a temperature responsive control device adapted for use with a rotary filling machine for fluent material of the type having adjustment means to change the volume of material dispensed from its filling heads, the combination of: a temperature responsive unit having a temperature sensing element for insertion into the fluent material, a link member operatively connected to said temperature responsive unit for movement thereby, a pivoted sector element having an eccentric trackway, said pivoted sector element being connected to said link member for movement thereby, a cam follower associated with the eccentric trackway of said pivoted sector and movable thereby when said sector element is pivoted, said cam follower adapted to be operatively connected to the adjustment means of the filling machine to thereby cause the same to change the volume dispensed by the filling heads upon a differential in temperature sensed by said temperature sensing element.

References Cited in the file of this patent

UNITED STATES PATENTS

| | | |
|---|---|---|
| 1,850,425 | Taylor | Mar. 22, 1932 |
| 2,302,529 | Cornell et al. | Nov. 17, 1942 |